United States Patent [19]

Kim

[11] Patent Number: 5,796,705
[45] Date of Patent: Aug. 18, 1998

[54] ENHANCED PARALLEL PORT ADAPTOR FOR INTERFACING A PC TO A CD-ROM DRIVER

[75] Inventor: Yong Jun Kim, Seoul, Rep. of Korea

[73] Assignee: LG Electronics Inc., Seoul, Rep. of Korea

[21] Appl. No.: 520,488

[22] Filed: Aug. 29, 1995

[30] Foreign Application Priority Data

Aug. 29, 1994 [KR] Rep. of Korea .................. 21434/1994

[51] Int. Cl.[6] ............................ G06F 15/80; G06F 15/16; G11B 7/00
[52] U.S. Cl. ........................ 369/124; 395/821; 395/281; 395/841
[58] Field of Search ................. 369/124, 32; 364/188, 364/551.01, 579, 708.1; 395/12, 50, 154, 161, 163, 911, 275, 222, 250, 200.1, 115, 114, 821, 281

[56] References Cited

U.S. PATENT DOCUMENTS

| | | | |
|---|---|---|---|
| 5,185,853 | 2/1993 | Cheng et al. | 395/115 |
| 5,208,745 | 5/1993 | Quentin et al. | 364/188 |
| 5,404,452 | 4/1995 | Detschel et al. | 395/250 |
| 5,408,614 | 4/1995 | Thornton et al. | 395/841 |
| 5,555,436 | 9/1996 | Gavish | 395/821 |
| 5,600,793 | 2/1997 | Nord | 395/200.01 |

*Primary Examiner*—Georgia Y. Epps
*Assistant Examiner*—Kim-Kwok Chu
*Attorney, Agent, or Firm*—John P. White

[57] ABSTRACT

A CD-ROM interface device whereby a CD-ROM drive is easily interfaced with a personal computer (PC) using an enhanced parallel port (EPP) for the PC, includes signal buffer for buffering and outputting a reset signal, a first write signal, an address strobe signal, a data strobe signal, a wait signal, a status enable signal, a data enable signal, a status signal, and first and second data. A control signal generator means for generating a second write signal, a read signal and a wait signal from the first write signal, the address strobe signal, the data strobe signal, and an identification enable signal.

7 Claims, 14 Drawing Sheets

F I G.14

ENHANCED PARALLEL PORT ADAPTOR FOR INTERFACING A PC TO A CD-ROM DRIVER

BACKGROUND OF THE INVENTION

The present invention relates to a CD-ROM drive interface device, and more particularly, to a CD-ROM drive interface device whereby a CD-ROM drive is easily interfaced with a personal computer (PC) using an enhanced parallel port (EPP) for the PC.

A SCSI method and an AT-bus method are generally used in the interface of a CD-ROM.

The SCSI interfacing method is a standardized method, and the AT-bus interfacing method is an original method for implementing an interface using an AT-bus.

Figure 1:
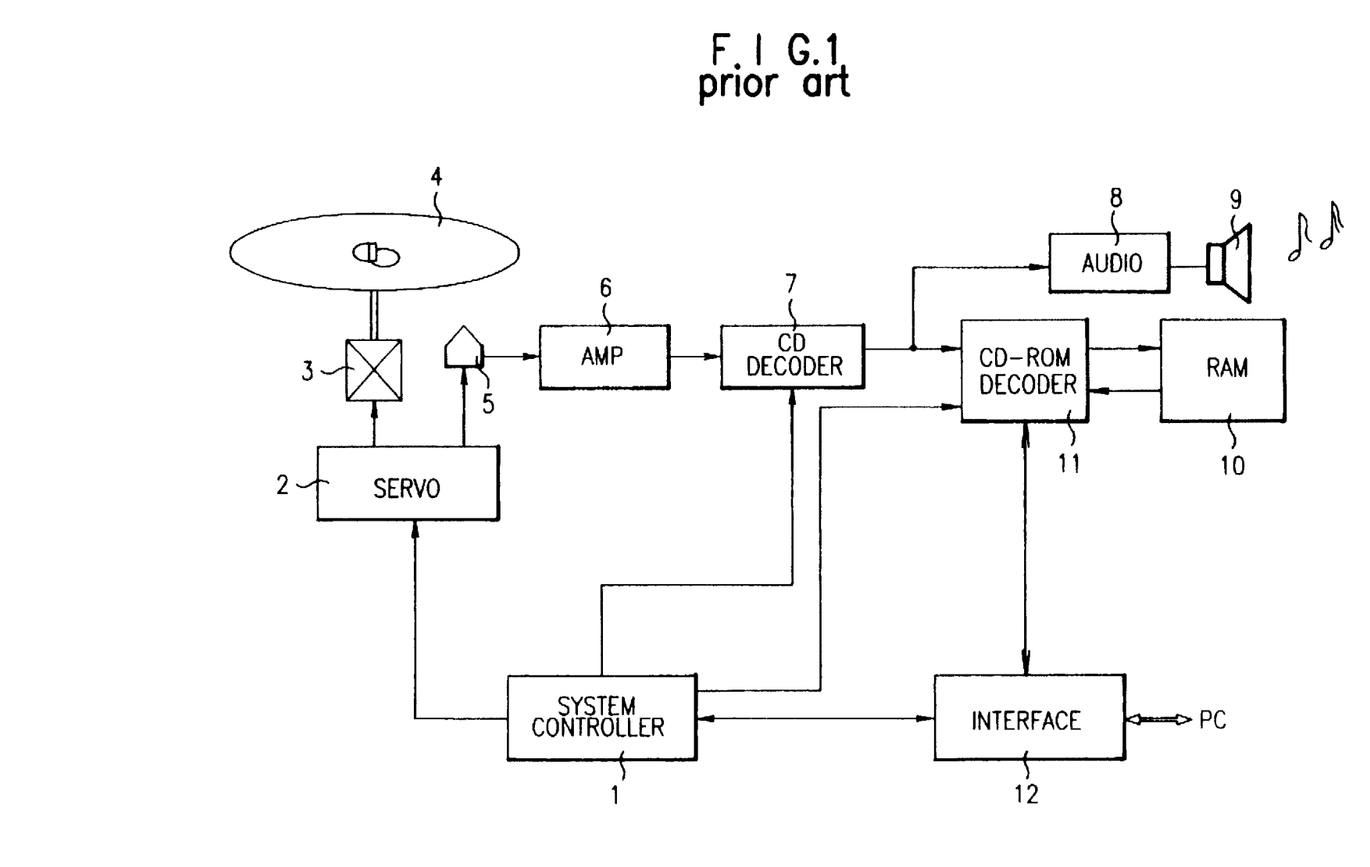
FIG. 1 is a block diagram showing the overall construction of a conventional CD-ROM drive.

FIG. 1 is a block diagram showing the overall construction of a conventional CD-ROM adopting the above interfacing method. As shown in FIG. 1, the conventional CD-ROM is constituted by a system controller 1 for controlling a servo while interfacing with a PC, a servo 2 for outputting spindle motor 3 and slide motor driving signal in accordance with a servo control signal output from system controller 1, a pickup 5 for reading and detecting information recorded onto a compact disk 4 in accordance with the slide motor driving signal output form servo 2, an amplifier (AMP) 6 for amplifying the signal obtained from pickup 5, a CD Decoder 7 for correcting an error of the signal obtained from AMP 6 in accordance with a control signal output from system controller 1, an audio 8 for detecting only an audio signal from the signals output from CD Decoder 7 and converting the audio signal into an analog signal to then transmit the same into a speaker 9, a CD-ROM Decoder 11 for extracting data from the signal obtained from CD Decoder 7 under the control of system controller 1, recorrecting an error, storing the same in an RAM 10 and drawing output data recorded in RAM 10, and an interface 12 for transmitting the signal output from CD-ROM Decoder 11 to PC and applying the signal obtained from PC to CD-ROM Decoder 11 and system controller 1.

The operation of the conventional CD-ROM having the above configuration will now be described in detail.

First, in the state where PC and CD-ROM drive are interfaced, system controller 1 outputs a servo control signal and an error correction signal.

The signal output from system controller 1 is input to servo 2, and servo 2 drives spindle motor 3 and slide motor for driving pickup 5, accordingly.

Then, CD-ROM 4 rotates, and pickup 5 reads data recorded in rotating CD-ROM 4 and converts the read data into electrical signals.

AMP 6 amplifies the signal electrically converted from pickup 5 to a predetermined level, and CD Decoder 7 corrects the errors of the amplified signal.

The digital signals whose errors are corrected in CD Decoder 7 are input to audio 8 and CD-ROM Decoder 11, respectively. Accordingly, audio 8 extracts only the audio signal from the input digital signals and converts the extracted signal into an analog audio signal to then transmit to speaker 9.

Also, CD-ROM Decoder 11 extracts only data from input digital signals and corrects their errors under the control of system controller 1 and then stored them in RAM 10.

The signal stored in RAM 10 and the signal read from CD-ROM 4 are transmitted to PC via interface 12. The signal transmitted from PC is also transmitted to CD-ROM Decoder 11 of CD-ROM drive.

However, since the conventional CD-ROM drive uses the SCSI interfacing method and AT-bus interfacing method which are not incorporated in PC, interface card should be separately installed in the extension slot for PC for the purpose of interfacing with PC.

Also, in the case of a notebook PC having no extension slot, interfacing is more difficult.

SUMMARY OF THE INVENTION

In order to solve the above problems, it is an object of the present invention to provide a CD-ROM drive interface device whereby a CD-ROM drive is easily interfaced with an enhanced parallel port (EPP) of a personal computer (PC).

It is another object of the present invention to provide a CD-ROM drive interface device whereby a CD-ROM drive is easily interfaced with a PC without using a separate interface card.

It is still another object of the present invention to provide a CD-ROM drive interface device whereby a CD-ROM drive is interfaced with a notebook PC having no extension slot.

To accomplish the above objects, there is provided a CD-ROM interface device comprising:

Signal buffer for buffering and outputting a reset signal, a first write signal, an address strobe signal, a data strobe signal, a wait signal, a status enable signal, a data enable signal, a status signal, and first and second data;

Control signal generator for generating a second write signal, a read signal and a wait signal from the first write signal, the address strobe signal, the data strobe signal, and an identification enable signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The present invention is proposed to allow the connection between a personal computer (PC) and a CD-ROM drive by constructing the interface with CD-ROM drive using an enhanced parallel port (EPP) incorporated in PC without installing a hardware in PC separately, in order to solve the inconvenience in connecting the conventional CD-ROM drive.

EPP, functionally being better than a conventional parallel port, has a compatibility with the conventional parallel port and is improved from 300 KB/sec to 1 MB/sec in data transmission speed. Also, EPP can transmit data bidirectionally while the conventional parallel port transmits data unidirectionally, i.e., from PC to a printer.

Figure 2:
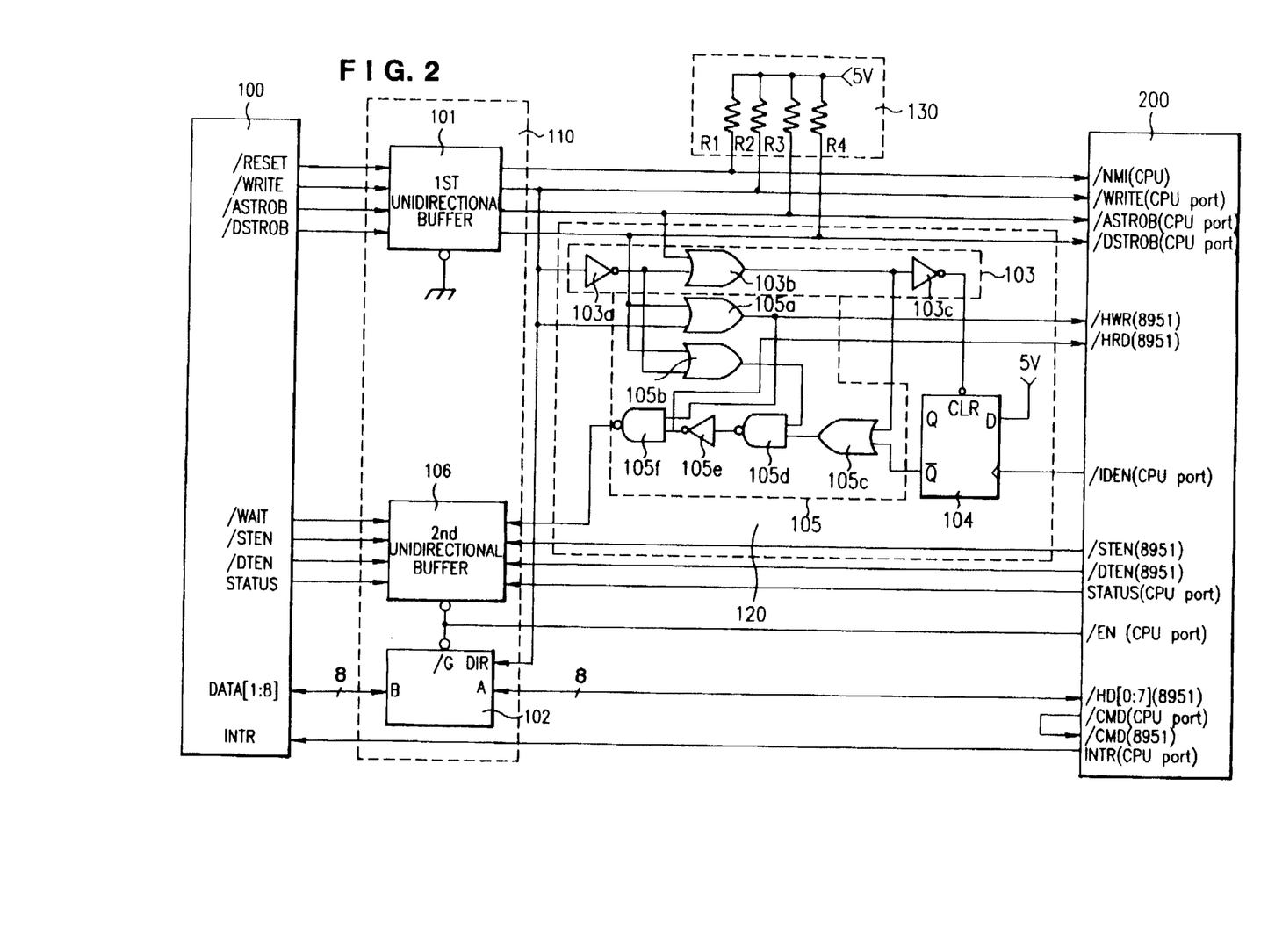
FIG. 2 is a circuit diagram of a CD-ROM drive interface device according to the present invention.

FIG. 2 is a circuit diagram of a CD-ROM drive interface device according to the present invention. As shown in FIG. 2, the CD-ROM drive interface device according to the present invention is constituted by a signal buffer 110, a control signal generator 120 and a signal pull-up resistance 130.

Signal buffer 110 buffers and outputs processed signals, a reset signal (/RESET), a first write signal (/WRITE), an address strobe signal (/ASTROB), a data strobe signal (/DSTROB), a wait signal (/WAIT), a status enable signal (/STEN), a data enable signal (/DTEN), a status signal (STATUS), and first and second data (DATA and HD).

Control signal generator 120 performs a logic operation of the first write signal (/WRITE) and address strobe signal (/ASTROB) output from signal buffer 110 to then latch an identification enable signal (/IDEN) in accordance to the logic-operated output signal, generates a second write signal (/HWR), a read signal (/HRD) and the wait signal (/WAIT) from first write signal (/WRITE), address strobe signal (/ASTROB), data strobe signal (/DSTROB), and the identification enable signal (/IDEN) from system controller 1.

Signal pull-up resistance 130 pulls up the reset signal, first write signal, address strobe signal and data strobe signal output from the signal buffer 110.

To be more detail, signal buffer 110 includes a first unidirectional buffer 101 for buffering and outputting the reset signal (/RESET), first write signal (/WRITE), address strobe signal (/ASTROB) and data strobe signal (/DSTROB) output from PC 100, a bidirectonal buffer 102 for buffering the second data HD output from CD-ROM drive 200 to then output to PC 100 and buffering the first data DATA output from PC 100 to then output to CD-ROM drive 200, and a second unidirectional buffer 106 for buffering the wait signal (/WAIT) output from control signal generator 120 and the status enable signal (/STEN), data enable signal (/DTEN) and status signal (STATUS) output from CD-ROM drive 200 to then output to PC 100.

Here, control signal generator 120 will be described in more detail.

Control signal generator 120 has a first inverter gate 103a for phase-inverting the first write signal (/WRITE) output from first unidirectional buffer 101 of signal buffer 110, a first OR gate 103b for performing an OR operation of the signal output from first inverter gate 103a and the address strobe signal (/ASTROB) output from first unidirectional buffer 101 and outputting the result, and a second inverter gate 103c for phase-inverting the signal output from first OR gate 103b and applying the same to latch 104 as a clear signal (CLR), a latch 104 for latching the identification enable signal (/IDEN) output from CD-ROM drive 200 in accordance with the logic operated output signal, a second OR gate 105a for performing an OR operation of the data strobe signal (/DSTROB) and first write signal (/WRITE) output from first unidirectional buffer 101 to generate the second write signal (/HWR), a third OR gate 105b for performing the data strobe signal (/DSTROB) output from first unidirectional buffer 101 and the output signal of first inverter gate 103a, a fourth OR gate 105c for performing the inverted output signal of latch 104 and the signal output from first OR gate 103b, a first NAND gate 105d for performing the output signals of fourth OR gate 105c and third OR gate 105b and inverting the same, a third inverter gate 105e for phase-inverting the output signal of first NAND gate 103d to generate the read signal (/HRD), and a second NAND gate 105f for performing an OR operation of the output signals of third inverter gate 105e and second OR gate 105a and inverting the same to generate the wait signal (/WAIT) and output to second unidirectional buffer 106.

Signal pull-up resistance 130 has first, second, third and fourth resistance R1, R2, R3 and R4 for pulling up the reset signal (/RESET), first write signal (/WRITE), address strobe signal (/ASTROB) and data strobe signal (/DSTROB), respectively.

The operation and effect of the CD-ROM interface device according to the present invention having the aforementioned configuration will now be described with reference to FIG. 3 through 13.

First, the following table shows the signals used in an EPP mode of PC adopted in the present invention.

TABLE

| Signals used in EPP mode (Standard 25-pin D-shell connector) | | | |
|---|---|---|---|
| Pin number | EPP signal | SPP signal | Type |
| 1 | /WRITE | /STROBE | O |
| 2–9 | DATA [1:8] | D [1:8] | I/O |
| 10 | INTR | /ACK | I |
| 11 | /WAIT | BUSY | I |
| 12 | USER1 (STATUS) | PE | I |
| 13 | USER3 (/STEN) | SELECT | I |
| 14 | /DSTROB | /AUTOFD | O |
| 15 | USER2 (/DTEN) | /FAULT | I |
| 16 | /RESET | /INIT | O |
| 17 | /ASTROB | /SELECTION | O |
| 18–25 | GND | GND | |

From the above table, "O" in the column of type represents a signal output from PC to CD-ROM drive, and "I" represents a signal input from CD-ROM drive to PC.

Also, USER1, USER2 and USER3 are signals which can be defined by users and represent a status signal (STATUS), status enable signal (/STEN), and data enable signal (/DTEN), respectively.

Figure 3:
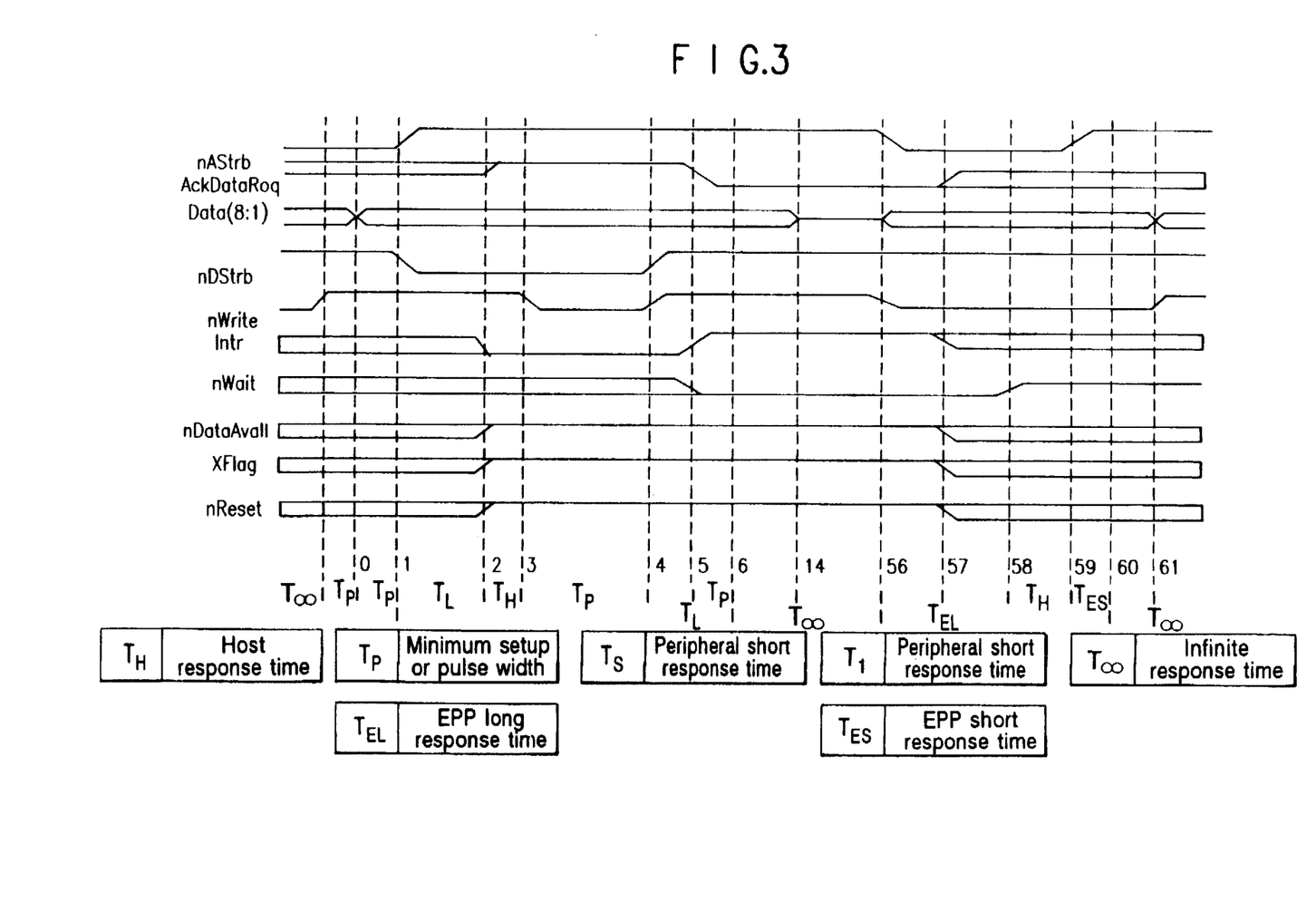
FIG. 3 is a signal waveform diagram during negotiation and address write and idle status in an EPP mode adopted in the present invention.

First, FIG. 3 is a signal waveform diagram during negotiation and address write and idle status in an EPP mode adopted in the present invention and shows the signal timing for converting a standard parallel port (SPP) mode into the EPP mode. That is to say, the respective signals are SPP signals used in the conventional parallel printer during SPP mode, and the respective signals are EPP signals during EPP mode due to a negotiation phase.

An EPP address write signal timing is a signal timing for transmitting address bytes from PC 100 to the device.

Figure 4:
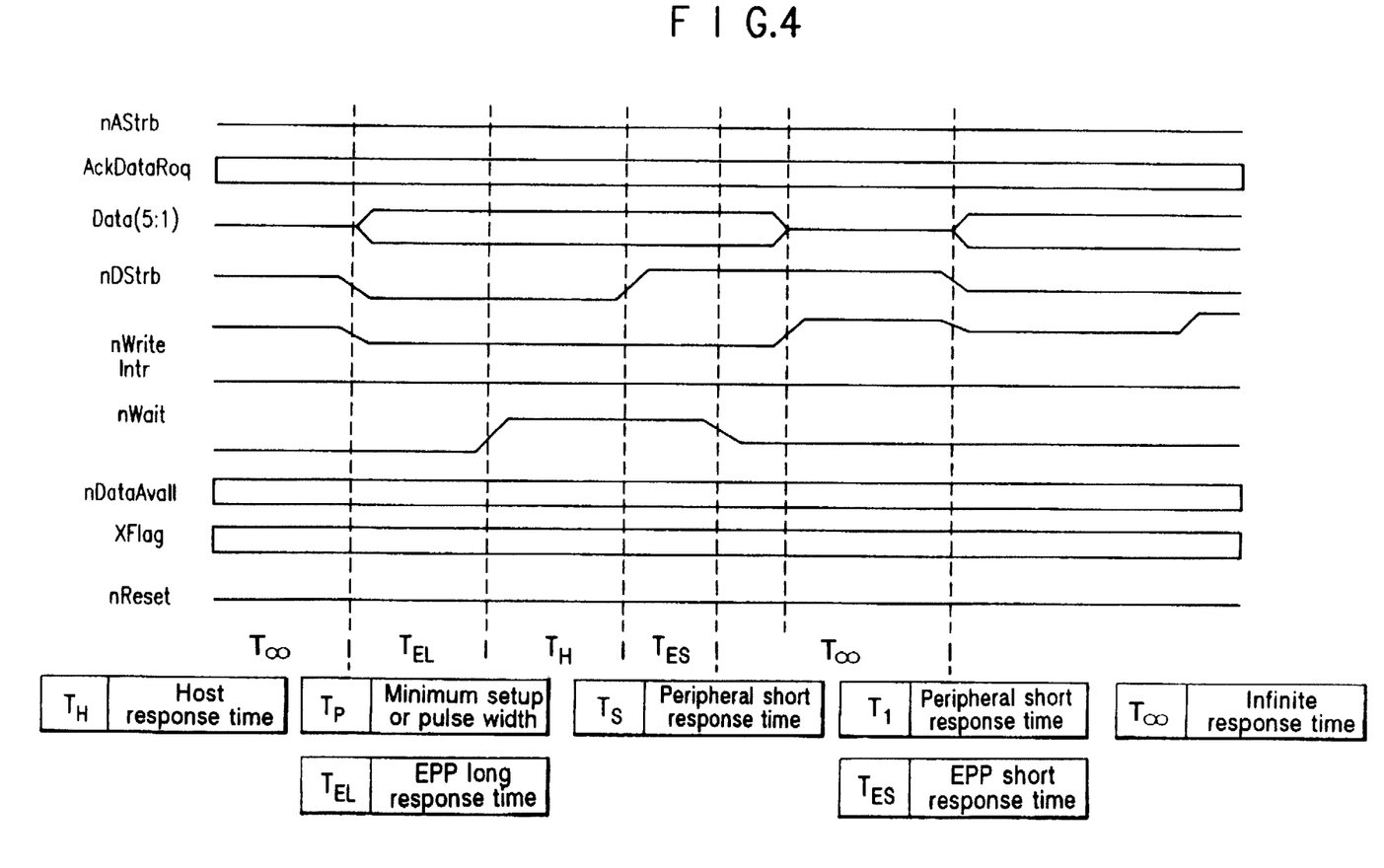
FIG. 4 is a signal waveform diagram during data write and idle status in an EPP mode adopted in the present invention.
Figure 5:
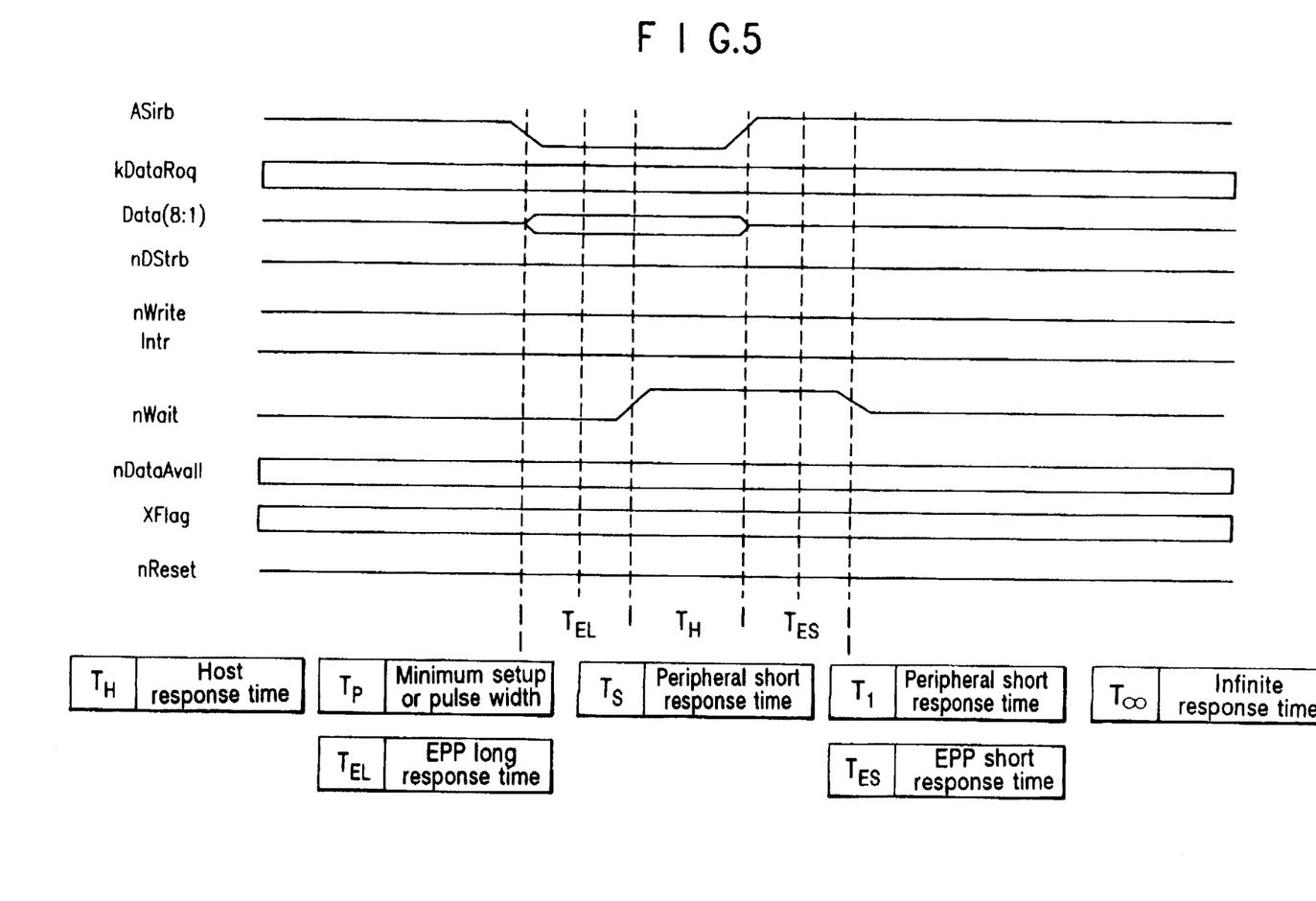
FIG. 5 is a signal waveform diagram during address read status in an EPP mode adopted in the present invention.
Figure 6:
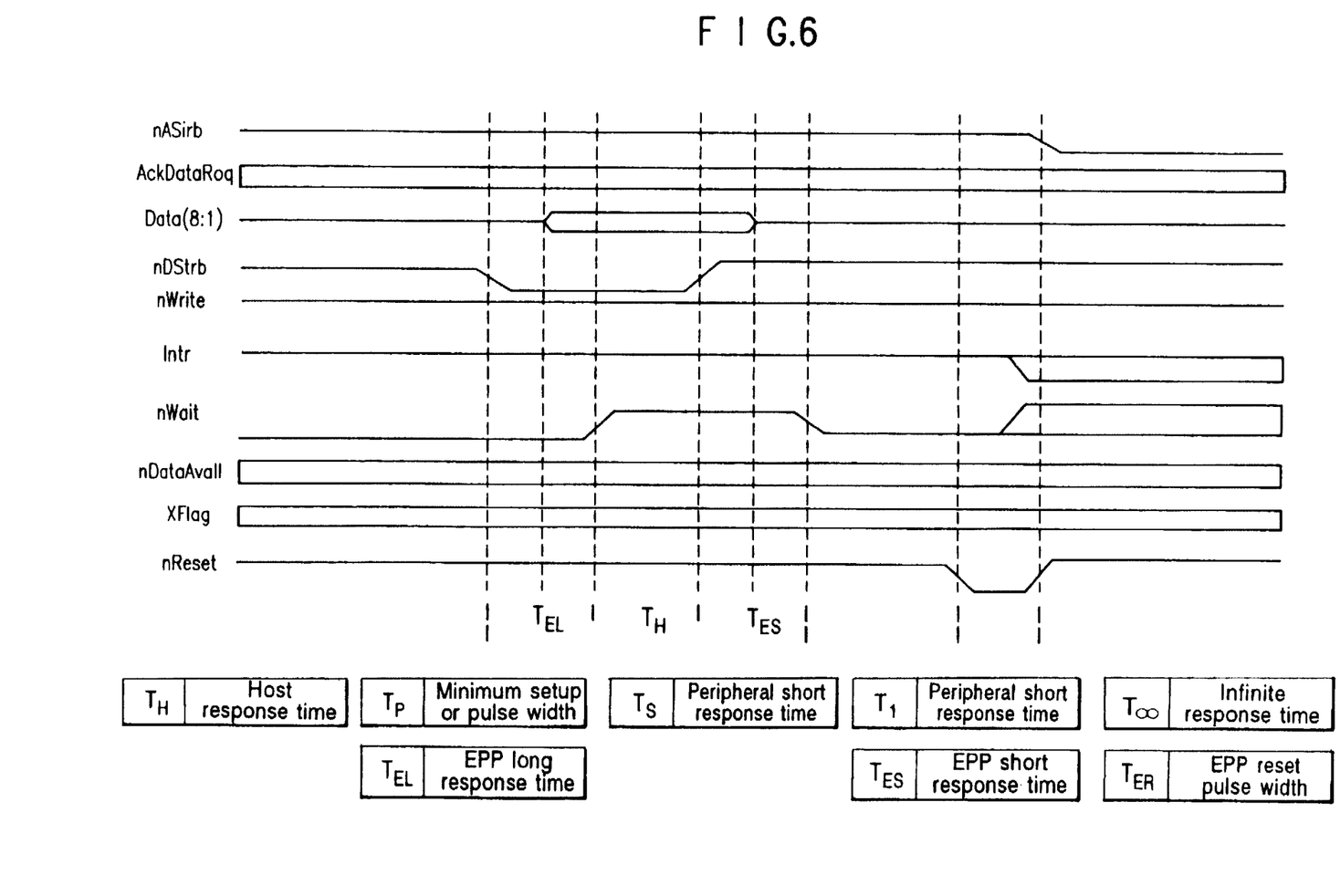
FIG. 6 is a signal waveform diagram during data write and termination status in an EPP mode adopted in the present invention.
Figure 7:
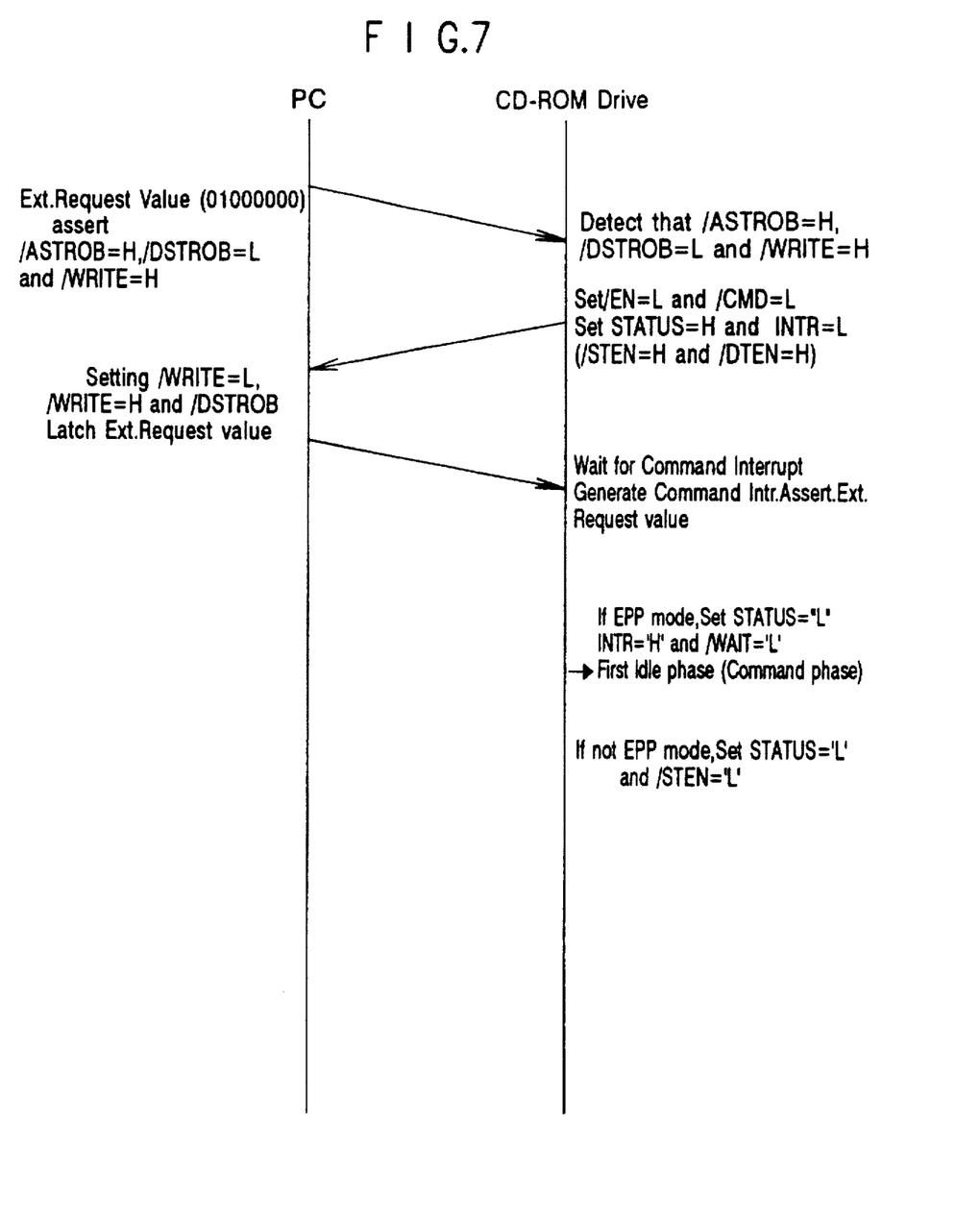
FIG. 7 shows a negotiation process between PC and CD-ROM drive shown in FIG. 2.

FIG. 4 is a signal waveform diagram during data write and idle status in an EPP mode adopted in the present invention and FIG. 5 is a signal waveform diagram during address read status in an EPP mode adopted in the present invention. FIG. 6 is a signal waveform diagram during data write and termination status in an EPP mode adopted in the present invention and FIG. 7 shows a negotiation process between PC and CD-ROM drive shown in FIG. 2. As shown in FIG. 7, PC 100 asserts an Ext. Request Value (0100 0000) to a data bus, and then outputs the address strobe signal (/ASTROB) to a high level, the data strobe signal (/DSTROB) to a low level, and the first write signal (/WRITE) to a high level. Accordingly, first unidirectional buffer 101 buffers and outputs the above respective signals (/WRITE, /ASTROB/ and /DSTROB), and the output signals are pulled up in signal pull-up resistance 130 and then are output to CD-ROM drive 200.

CD-ROM drive 200 detects via an input port that the address strobe signal (/ASTROB) is a high level signal, the data strobe signal (/DSTROB) is a low level signal, and that the first write signal (/WRITE) is a high level signal.

Then, an enable signal (/EN) and a command signal (/CMD) are set to low levels, the status signal (STATUS) signal is set to a high level and an interrupt signal (INTR) is set to a low level. At this time, the status enable signal (/STEN) and data enable signal (/DTEN) are 'high' status.

As described above, if the respective ports of CD-ROM drive 200 are set, PC 100 transfers the first write signal (/WRITE) to a low level and then transfers the first write signal (/WRITE) and data strobe signal (/DSTROB) back to a high level, to then latch the signal asserted to the data bus (0100 0000).

At this time, if CD-ROM drive 200 being in a command interrupt wait status receives a signal generated in PC 100, CD-ROM drive 200 generates a command interrupt signal and identifies inputted value.

During the EPP mode identification, the status signal (STATUS) is set to a low level, and the interrupt signal (INTR) is set to a high level. In this state, the wait signal (/WAIT) is set to a low level to enter a first idle phase.

During the external input signal identification, if the mode is not EPP mode, the status signal (STATUS) and status enable signal (/STEN) are set to low levels.

In this manner, the interface is converted into the EPP mode, and PC 100 completes to provide the transmission of a command code to CD-ROM drive 200.

Figure 8:
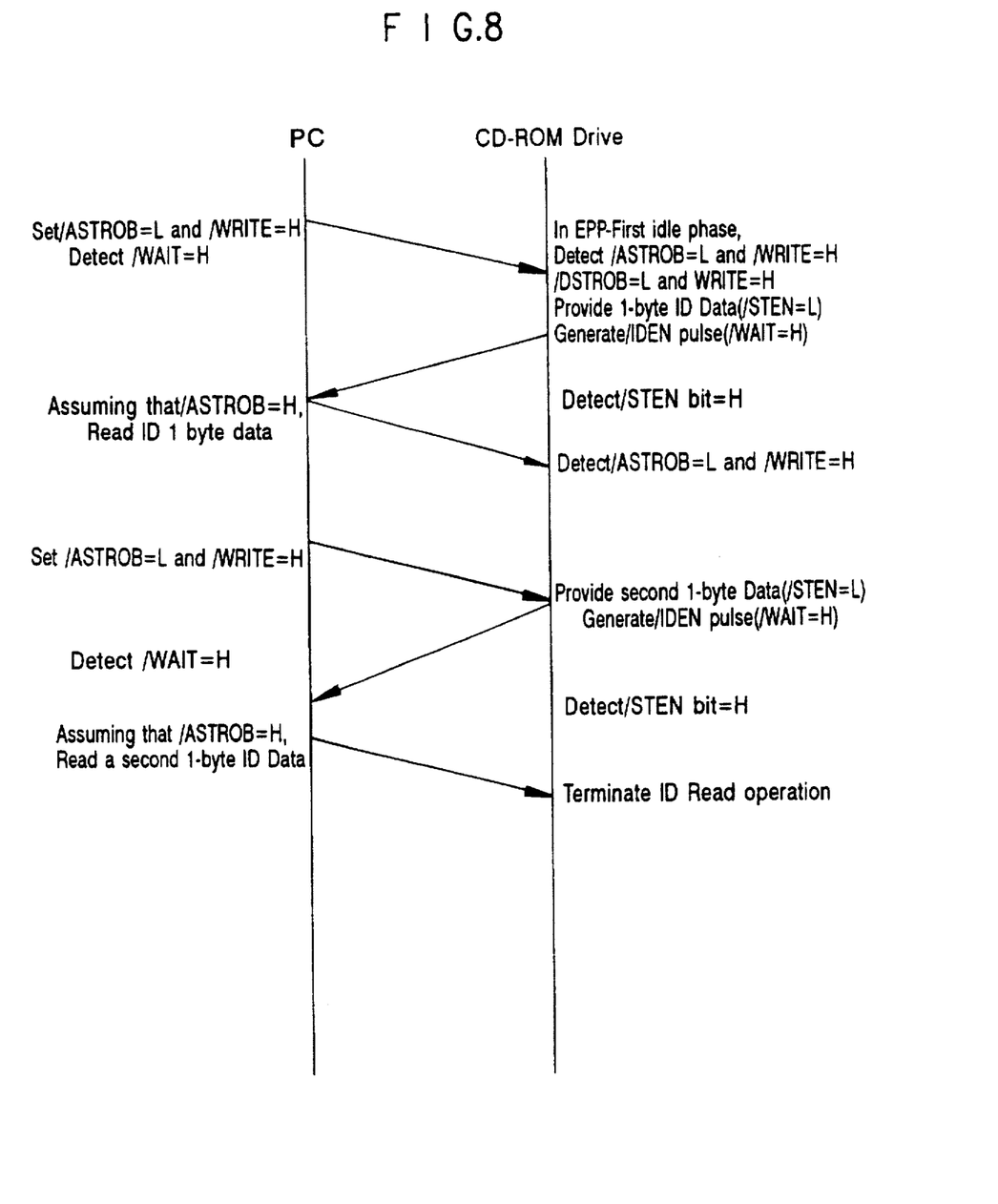
FIG. 8 shows a 1-byte identification (ID) data and address read process between PC and CD-ROM drive shown in FIG. 2.

FIG. 8 shows a 2-byte identification (ID) data and address read process between PC and CD-ROM drive shown in FIG. 2. As shown in FIG. 2, PC 100 outputs the address strobe signal (/ASTROB) to a low level signal, and the first write signal (/WRITE) to a high level signal.

Accordingly, if it is detected that the address strobe signal (/ASTROB) is a low level and the first write signal (/WRITE) is a high level during the first idle phase of the EPP mode, CD-ROM drive 200 prepares the first 1-byte identification data(ID) and sets the status enable signal (/STEN) to a low level and the identification enable signal (/IDEN) to a low level, and then the ID enable signal (/IDEN) to a high level, generates a pulse signal, and then sets the wait signal (/WAIT) to a high level.

Accordingly, PC 100 reads the first one byte identification data (ID) output from CD-ROM drive 200 in the state where the address strobe signal (/ASTROB) is a high level.

Thereafter, it the read operation is completed, PC 100 again generates the address strobe signal (/ASTROB) to a low level and the first write signal (/WRITE) to a high level.

Then, CD-ROM drive 200 detects that the status enable signal (/STEN) is a high level in EPP mode, the address strobe signal (/ASTROB) is a low level and the first write signal (/WRITE) is a high level.

As PC 100 sets the address strobe signal (/ASTROB) to a high level and the first write signal (/WRITE) to a low level, CD-ROM drive 200 prepares the second 1-byte ID data, sets the status enable signal (/STEN) and the identification enable signal (/IDEN) to a low level and the identification enable signal (/IDEN) to a high level again, generates a pulse signal, and then sets the wait signal (/WAIT) to a high level.

PC 100 sets the address strobe signal (/ASTROB) to a high level and reads the second 1-byte ID data if it is confirmed whether the wait signal (/WAIT) is set to a high level.

CD-ROM drive 200 confirms whether the status enable signal (/STEN) is set to a high level, and then completes a ID data phase.

Figure 9:
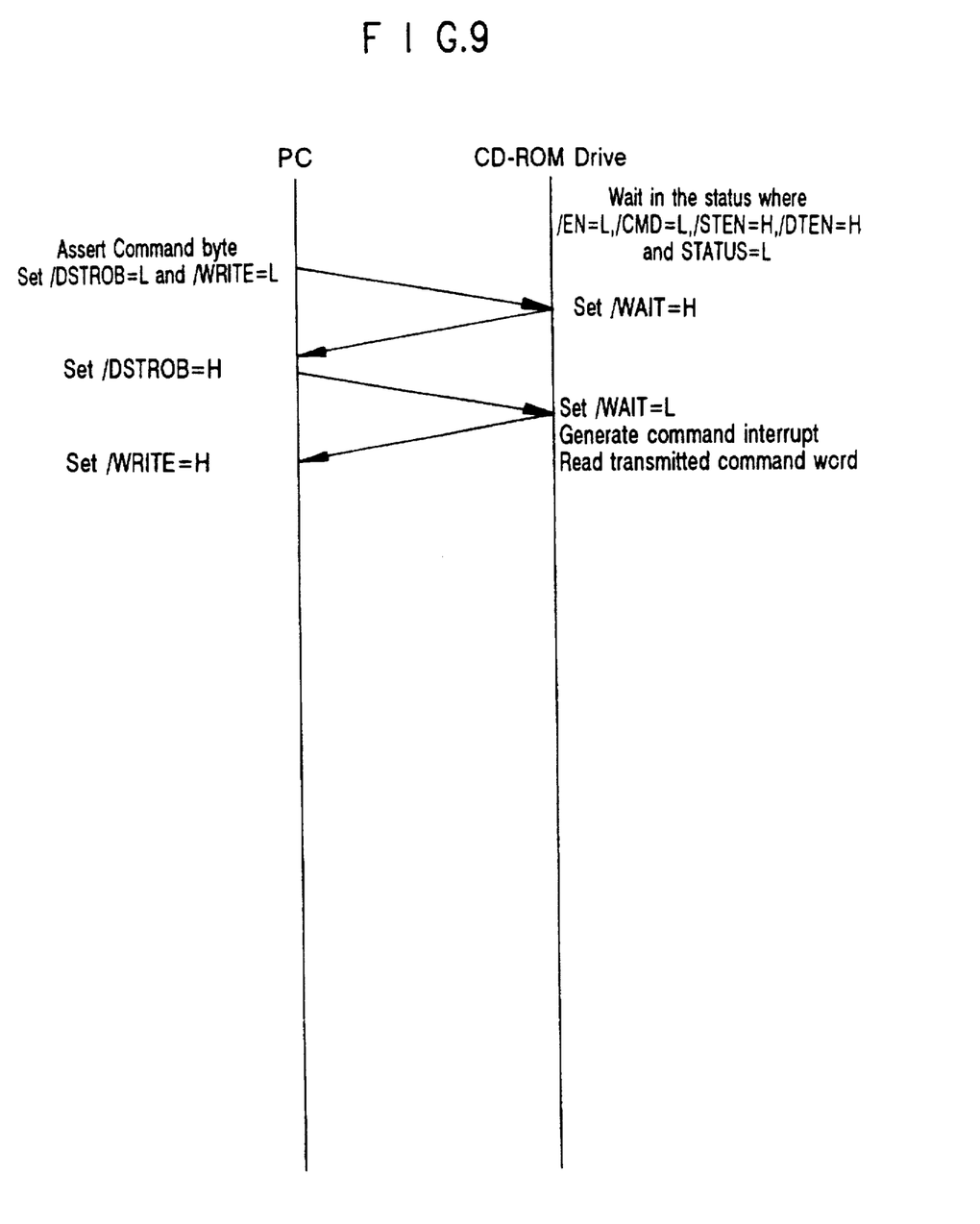
FIG. 9 shows a process of PC transmitting commands to CD-ROM drive shown in FIG. 2.

Next, FIG. 9 shows the process that PC 100 transmits commands to CD-ROM drive 200 shown in FIG. 2. As shown in FIG. 9, PC 100 sets the data strobe signal (/DSTROB) and the first write signal (/WRITE) to a low level in the state where 1-byte command is asserted.

At this time, CD-ROM drive 200 enters an idle phase in the state where the enable signal (/EN) and the command signal (/CND) are set to low levels, the status enable signal (/STEN) and the data enable signal (/DTEN) are set to high levels and the status signal (STATUS) is set to a low level.

In this manner, CD-ROM drive 200 being in an idle phase after setting the signals of the respective ports, sets the wait signal (/WAIT) to a high level, if the data strobe signal (/DSTROB) and the first write signal (/WRITE) in PC 100 are set to low level by control signal generator 120, as stated above.

Accordingly, control signal generator 120 transfers the wait signal (/WAIT) to a low level, generates a command interrupt, and CD-ROM drive 200 reads input commands.

And, PC 100 de-asserts 1-byte commands and sets the first write signal (/WRITE) to a high level, thereby completing the command transmission process. This command transmission process uses EPP data write phase.

Figure 10:
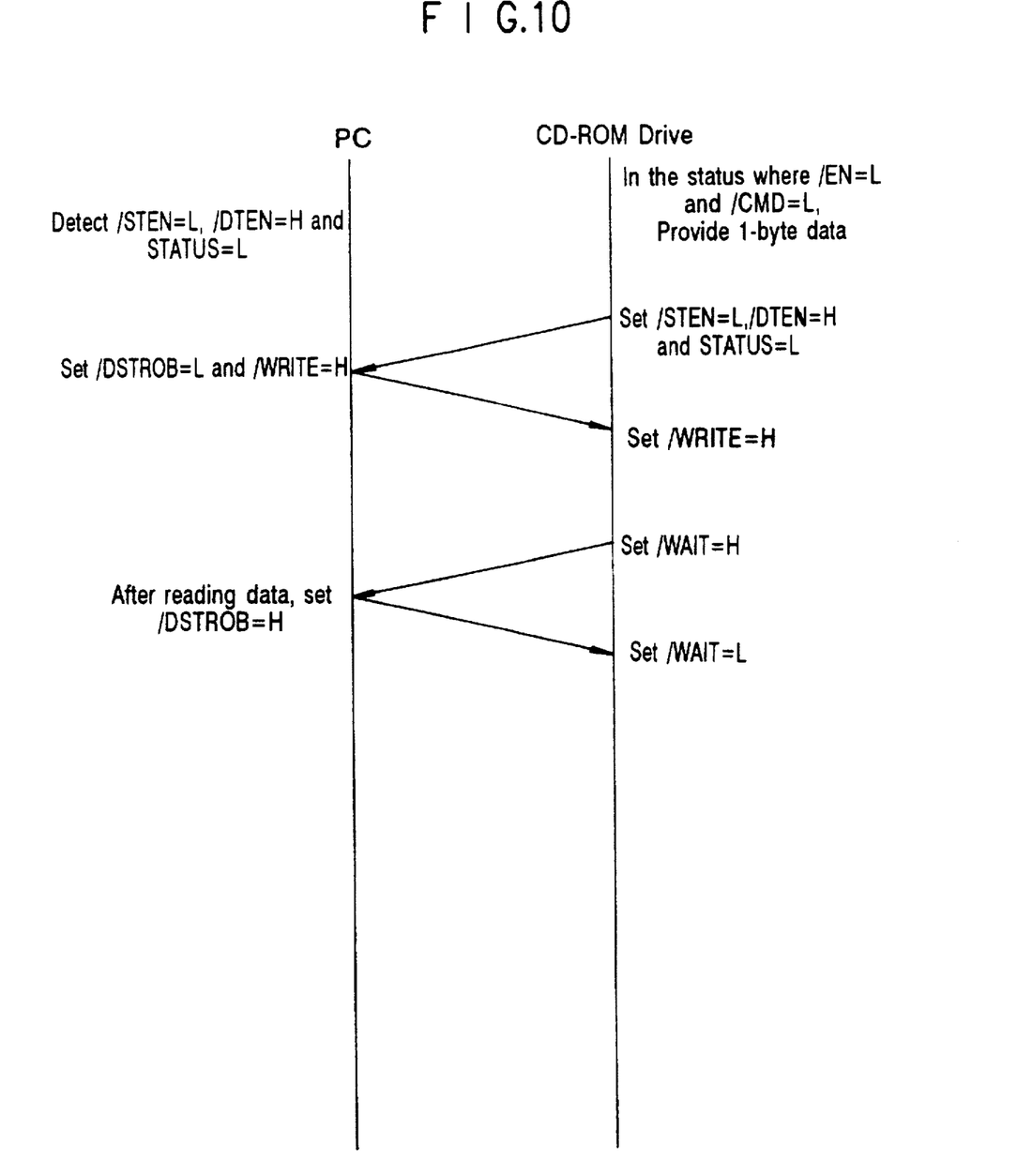
FIG. 10 shows a process of PC reading data in the unit of bytes supplied from CD-ROM drive shown in FIG. 2.

FIG. 10 explains the phase when PC 100 reads data in the byte units supplied from CD-ROM drive 200, as shown in FIG. 2.

PC 100 awaits that the status enable signal (/STEN) becomes low level, data enable signal (/DTEN) becomes a high level, and the status signal (/STATUS) becomes a low level.

Accordingly, CD-ROM drive 200 provides 1-byte data to be sent to a host in the state where the enable signal (/EN) and the command signal (/CMD) are set to low levels, and sets the status enable signal (/STEN) to a low level, data enable signal (/DTEN) to a high level, and the status signal (/STATUS) to a low level. Then, PC 100 waits for this state and sets the data strobe signal (/DSTROB) to a low level and the first write signal (/WRITE) to a high level if this state comes.

Accordingly, data are asserted to a data bus. CD-ROM drive 200 transfers the status enable signal (/STEN) to a high level and the wait signal (/WAIT) is set to a high level by control signal generator 120.

Then, PC 100 reads data and sets the data strobe signal (/DSTROB) to a high level. Accordingly, control signal generator 120 of CD-ROM drive 200 sets the wait signal (/WAIT) to a low level, thereby completing the read operation data in the unit of bytes.

Figure 11:
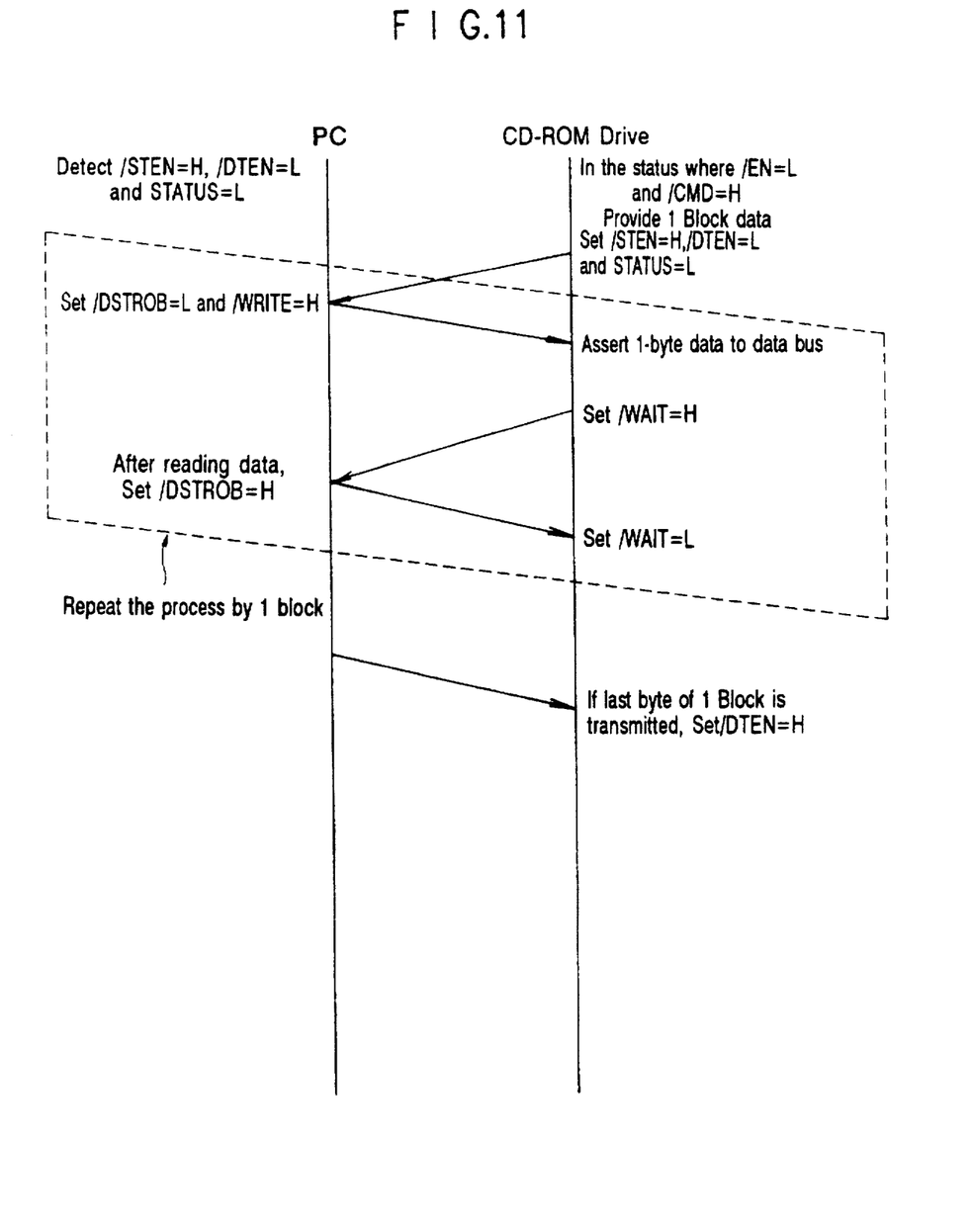
FIG. 11 shows a process of PC reading block data supplied from CD-ROM drive shown in FIG. 2.

FIG. 11 shows the phase when PC 100 reads data of block unit (2048 bytes) supplied from CD-ROM drive 200.

That is to say, in the state where the enable signal (/EN) is set to a low level and the command signal (/CMD) is set to a high level, CD-ROM drive 200 provides data of 1 block to be transmitted to PC 100 and sets the state enable signal (/STEN) to a high level and the data enable signal and status signal (STATUS) to low levels.

Accordingly, PC 100 sets the data strobe signal (/DSTROB) to a low level and the first write signal (/WRITE) to a high signal, if it is detected that the state enable signal (/STEN) is set to a high level, the data enable signal is set to a low level and the status signal (STATUS) is set to a low level.

Then, CD-ROM drive 200 asserts data of 1 byte to a data bus, and the wait signal (WAIT) is set to a high level by control signal generator 120.

Therefore, after reading data asserted to the data bus, PC 100 sets the data strobe signal (/DSTROB) to a high level, and then CD-ROM drive 200 de-asserts the data of 1 byte and the wait signal (WAIT) is set to a low level by control signal generator 120.

After repeating such a series of processes by one block, if the last byte of the one block is transmitted, PC 100 sets the data strobe signal (/DSTROB) to a high level, and then CD-ROM drive 200 sets the data enable signal (/DTEN) to a high level, thereby completing read operation of 1 block data.

Figure 12:
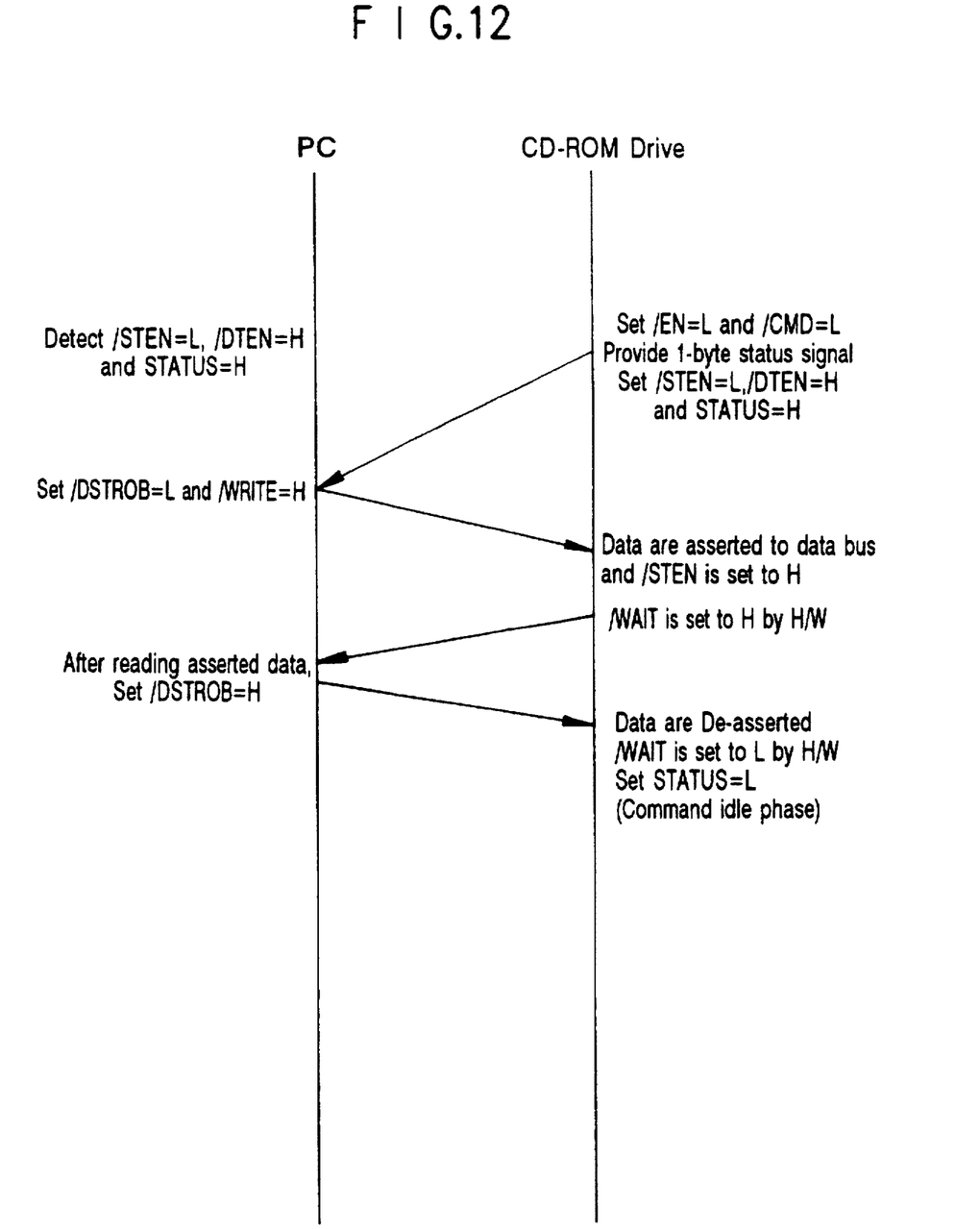
FIG. 12 shows a process of PC detecting reading status data indicating the command execution result of CD-ROM drive shown in FIG. 2.

FIG. 12 shows the process that PC 100 reads status data indicating the command execution result of CD-ROM drive 200. In the state where the enable signal (/EN) and the command signal (/CMD) are set to low levels, CD-ROM drive 200 provides a status signal (STATUS) of 1 byte to be transmitted to PC 100 and then sets the state enable signal (/STEN) to a low level, the data enable signal to a high level and the status signal (STATUS) to a high level.

Accordingly, PC 100 sets the data strobe signal (/DSTROB) to a low level and the wait signal (WAIT) to a high level, if it is detected that the state enable signal (/STEN) is set to a low level, the data enable signal is set to a high level and the status signal (STATUS) is set to a high level.

Then, CD-ROM drive 200 asserts 1-byte data to a data bus depending on command execution status and sets the status enable signal (/STEN) and the wait signal (/WAIT) is set to high levels by control signal generator 120.

Therefore, PC 100 reads command execution status data asserted to the data bus and then sets the data strobe signal (/DSTROB) to a high level. Then, CD-ROM drive 200 de-asserts 1-byte data, and the wait signal (/WAIT) and the status enable signal (/STEN) are set to low levels by control signal generator 120, thereby resulting in a command idle phase.

Figure 13:
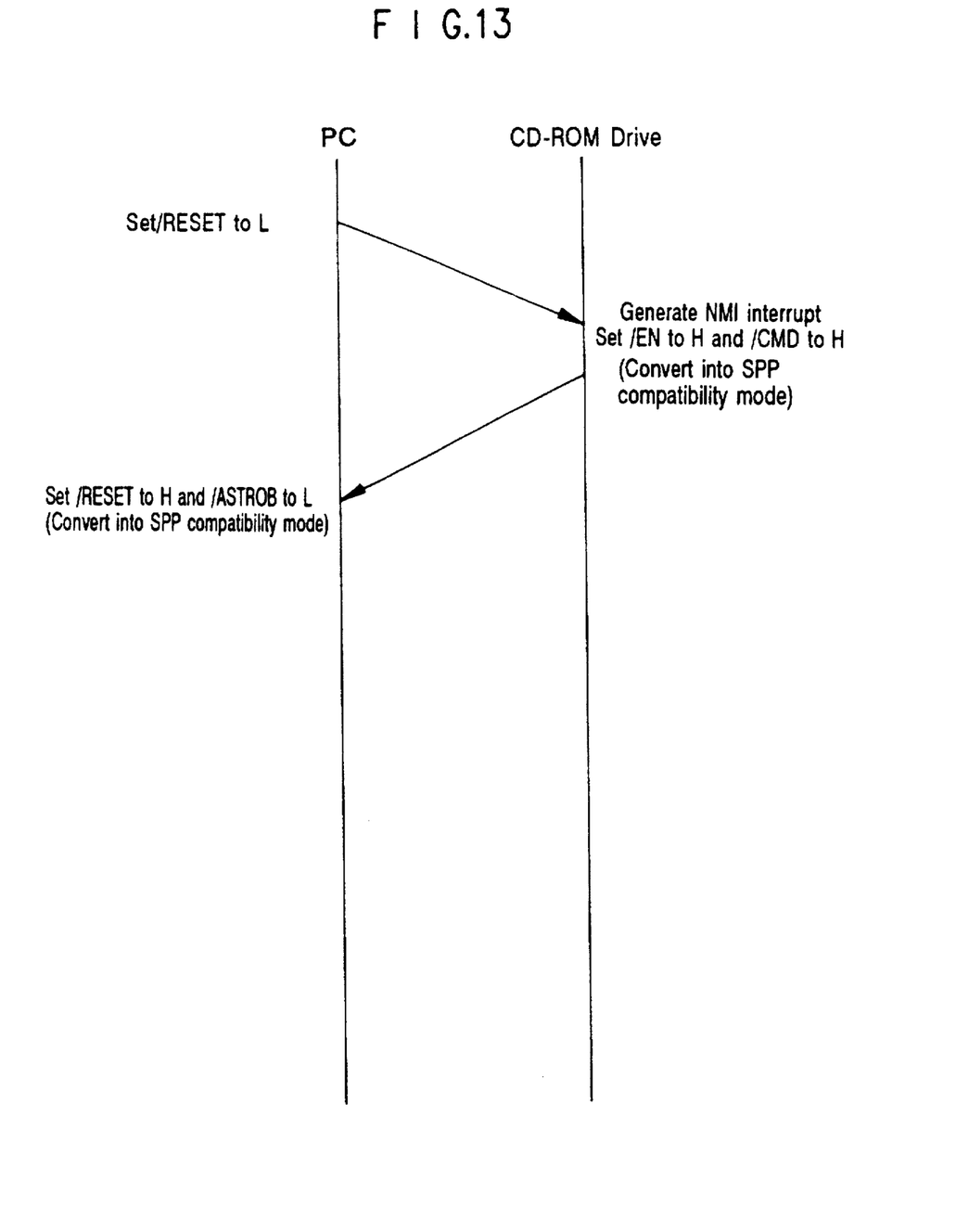
FIG. 13 shows a termination process between PC and CD-ROM drive shown in FIG. 2.

FIG. 13 shows a termination process between PC and CD-ROM drive shown in FIG. 2. As shown in FIG. 13, PC 100 sets the reset signal (/RESET) to a low level.

Accordingly, CD-ROM drive 200 generates a non-maskable interrupt (NMI) and sets the enable signal (/EN) and the command signal (/CMD) to high levels. Then, PC 100 sets the reset signal (/RESET) to a high level and the address strobe signal (/ASTROB) to a low level, thereby converting the mode into a SPP compatibility mode.

Figure 14:
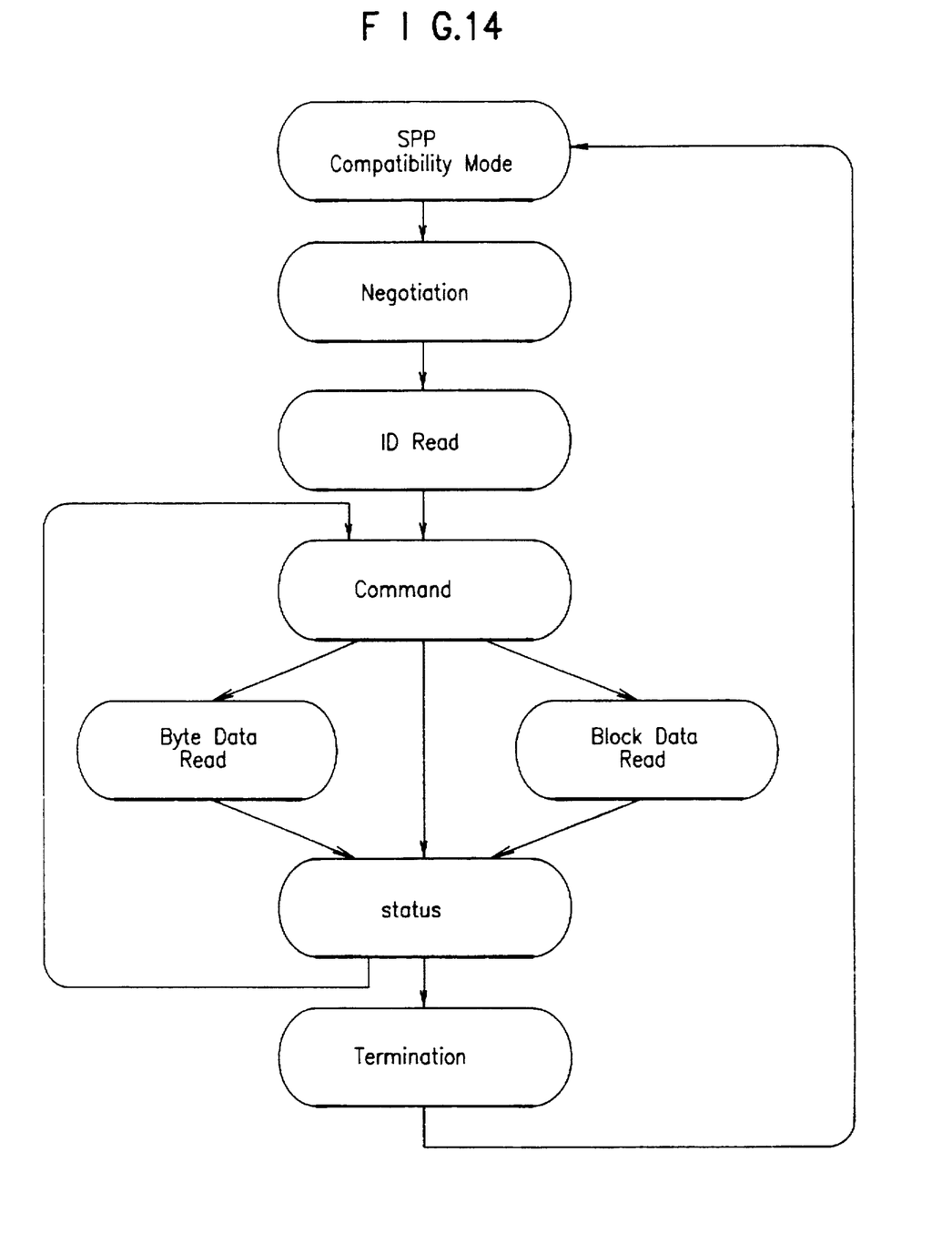
FIG. 14 is a flowchart showing the sequence of interface phases performed in the present invention.

FIG. 14 is a flowchart showing the sequence of interface phases performed in the present invention.

The interfacing method between PC and CD-ROM drive according to the present invention will now be described in detail with reference to FIG. 14.

First, PC 100 performs a negotiation step in order to convert the SPP compatibility mode into EPP mode.

Next, after reading ID data, PC 100 performs command phase step and transmits the 1-block data read command to CD-ROM drive 200.

At this time, if the ID data is not read during performing the negotiation step, the process directly proceeds to a command phase execution step not to the ID data read step.

During the command phase execution step, if the data are ones in the unit of bytes, the read operation of the data in the unit of bytes is performed, thereby reading the 1-byte data. If the data are ones in the unit of blocks, the read operation of the data in the unit of blocks is performed, thereby reading the 1-block data.

Thereafter, a status phase step is performed, thereby reading the command execution result. In the command phase execution step, if the data are not byte unit data nor block unit data, the process proceeds directly to the status phase execution step.

Then, PC 100 proceeds to the command phase execution step for executing the next command. If there is no next command, termination phase is executed and then the mode is converted back into the SPP compatibility mode.

As described above, since an EPP is a port incorporated with a PC, the interface between PC and CD-ROM is easily attained using the CD-ROM drive interface device according to the present invention, without installing a separate interface card.

Also, in the case of a notebook PC having no extension slot, the EPP of the notebook PC and the CD-ROM drive can be easily interfaced using the CD-ROM interface device according to the present invention.

What is claimed is:

1. Enhanced parallel port (EPP) adaptor for interfacing a PC to a CD-ROM driver via an enhanced PC parallel port comprising:

a first unidirectional buffer for storing control signals in the form of EPP standard outputted from the enhanced PC parallel port;

a bidirectional buffer for transferring data between the PC and the CD-ROM driver; and a means for converting the control signals in the form of EPP standard outputted from the first unidirectional buffer into CD-ROM standard, and converting the control signals in the form of CD-ROM standard into the control signals in the form of EPP standard.

2. Enhanced parallel port (EPP) adaptor for interfacing a PC to a CD-ROM driver as claimed in claim 1, wherein said first unidirectional buffer stores and outputs input reset signal first write signal, address strobe signal and data strobe signal.

3. Enhanced parallel port (EPP) adaptor for interfacing a PC to a CD-ROM driver as claimed in claim 1, wherein said bidirectional buffer stores and outputs first and second processed data.

4. Enhanced parallel port (EPP) adaptor for interfacing a PC to a CD-ROM driver as claimed in claim 1, wherein said second unidirectional buffer stores and outputs a wait signal output from said converting means, the control signal and status signal.

5. Enhanced parallel port (EPP) adaptor for interfacing a PC to a CD-ROM driver as claimed in claim 1, wherein said converting means comprises:

a first inverter gate for phase-inverting a first write signal output from said first unidirectional buffer of a signal buffering means;

a first OR gate for performing an OR operation of a signal output from said first inverter gate and an address strobe signal output from said first unidirectional buffer and outputting the result;

a second inverter gate for phase-inverting the signal output from said first OR gate and applying the same as a clear signal;

a latch for latching an input identification enable signal in accordance with a logic operated output signal;

a second OR gate for performing an OR operation of a data strobe signal and a first write signal output from said first unidirectional buffer to generate a second write signal;

a third OR gate for performing an OR operation of a data strobe signal output from said first unidirectional buffer and an output signal of said first inverter gate;

a fourth OR gate for performing an OR operation of an inverted output signal of said latch and a signal output from said first OR gate;

a first NAND gate for performing an OR operation of an output signals of said fourth OR gate and third OR gate and inverting said signals;

a third inverter gate for phase-inverting an output signal of said first NAND gate to generate a read signal; and a second NAND gate for performing an OR operation of the output signals of said third inverter gate and second OR gate and inverting the same to generate a wait signal and output to said second unidirectional buffer.

6. Enhanced parallel port (EPP) adaptor for interfacing a PC to a CD-ROM driver as claimed in claim 1, further comprising:

a signal pull-up resistance means for pulling up a reset signal, first write signal, address strobe signal and data strobe signal output from a signal buffering means.

7. Enhanced parallel port (EPP) adaptor for interfacing a PC to CD-ROM driver as claimed in claim 6, wherein said signal pull-up resistance means comprises:

a first resistance for pulling up a reset signal;

a second resistance for pulling up a first write signal;

a third resistance for pulling up an address strobe signal; and a fourth resistance for pulling up a data strobe signal, wherein said reset signal, first write signal, address strobe signal and data strobe signal are output from said signal buffering means.

* * * * *